United States Patent

Fluegel

[15] 3,690,177
[45] Sept. 12, 1972

[54] THERMOCOUPLE REFERENCE JUNCTION

[72] Inventor: Dale A. Fluegel, c/o Phillips Petroleum Company, Bartlesville, Okla. 74003

[22] Filed: Nov. 16, 1970

[21] Appl. No.: 89,900

[52] U.S. Cl. ................................ 73/361, 136/222
[51] Int. Cl. ........................................... G01k 7/12
[58] Field of Search ............ 73/361; 136/222; 236/9

[56] References Cited

UNITED STATES PATENTS

| | | | |
|---|---|---|---|
| 2,836,639 | 5/1958 | Templin | 73/361 |
| 2,868,461 | 1/1959 | Gaddis | 236/9 |
| 3,069,909 | 12/1962 | Hines | 73/361 |
| 3,503,260 | 3/1970 | Polsky | 73/361 |

*Primary Examiner*—Louis R. Prince
*Assistant Examiner*—Denis E. Corr
*Attorney*—Young & Quigg

[57] ABSTRACT

Reference thermocouple junctions are maintained at a constant temperature by an insulated housing which surrounds the junctions. A heating element is contained within the housing. Temperature sensing elements disposed within and outside the housing control the heating element. The thermocouple junctions, internal sensing element and heating element can be secured to a metal block within the housing.

4 Claims, 5 Drawing Figures

PATENTED SEP 12 1972

INVENTOR.
D. A. FLUEGEL

BY Young & Quigg

ATTORNEYS

THERMOCOUPLE REFERENCE JUNCTION

It is common practice in various industrial operations to control processes and equipment automatically in response to changes in measured variables. Temperature is perhaps the most common of these variables. Thermocouples are often used to measure temperature because of the relatively low cost and high reliability of such instruments. However, in order to provide accurate temperature measurements it is necessary to maintain the reference junction at a constant temperature. This invention is directed toward providing simple and compact apparatus which can be employed for this purpose.

In accordance with this invention, an insulated housing is provided which is capable of being maintained at a constant temperature. A metal block is positioned within the housing to provide a heat sink. The thermocouple junctions to be maintained at a constant temperature are secured to the block, such as by being inserted within holes drilled in the block. One or more heating elements and a temperature sensing element are positioned in thermal contact with the block. A second temperature sensing element is positioned immediately outside the housing to measure the temperature of the ambient air surrounding the housing. An electrical circuit is provided to control current supplied to the heating element in response to a signal which is representative of the two temperatures measured by the sensing elements.

In the accompanying drawing.

Figure 1:
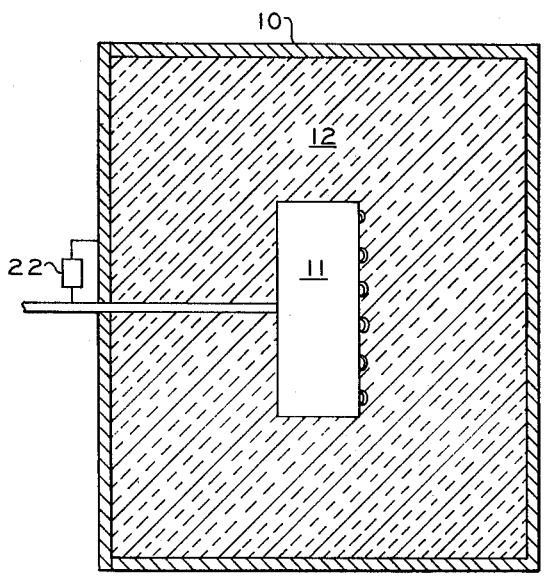
FIG. 1 is a view, shown partially in section, of the insulating housing having the temperature controlled thermocouple reference junction block positioned therein.

Referring now to the drawing in detail and to FIG. 1 in particular, there is shown a housing 10 having a metal block in the form of a disk 11 positioned therein. A mass of thermal insulating material 12 surrounds disc 11. As will be described hereinafter in greater detail, a plurality of reference thermocouple junctions are positioned within disk 11, and the disk is maintained at a constant temperature.

Figure 2:
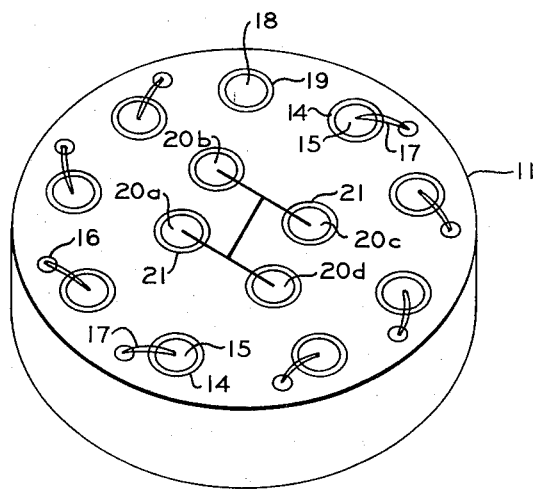
FIG. 2 illustrates the metal block positioned in the housing of FIG. 1.

Disk 11 is illustrated in greater detail in FIG. 2. A plurality of openings 14 are drilled in the first side of the disk, but do not extend all the way through the disk. A reference thermocouple assembly 15 is positioned within each of the openings 14. A plurality of holes 16 are drilled through disk 11 adjacent respective openings 14. Electrical leads 17 extend through holes 16 into engagement with the thermocouple junction assemblies. A first temperature sensitive resistance element 18 is positioned within a hole 19 which extends through disk 11. Four heating elements 20a, 20b, 20c and 20d are positioned in individual holes 21 which extend through disk 11. A second temperature sensitive resistance element 22 is mounted outside housing 10 of FIG. 1.

Figure 3:
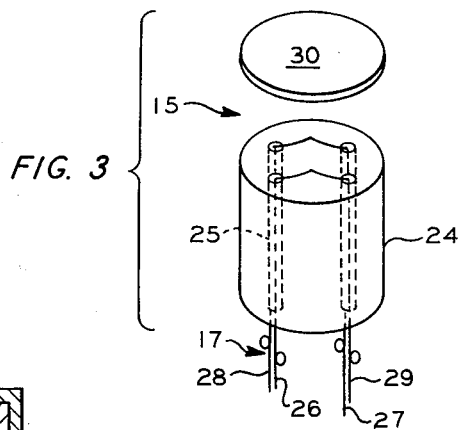
FIG. 3 illustrates one of the reference thermocouple junctions positioned within the block of FIG. 2.

One of the reference thermocouple junction assemblies 15 is illustrated in FIG. 3. A cylinder 24 is provided with four longitudinal passages 25 through which electrical conductors 26, 27, 28 and 29 extend. These four conductors constitute a lead 17 shown in FIG. 2. Conductors 26 and 27 are joined at the end of cylinder 24, as are conductors 28 and 29, thereby forming two reference thermocouple junctions. A flat disk of insulating material 30 is positioned across the end of cylinder 24, and the resulting assembly is inserted into an opening 14 in disk 11. The reference thermocouple assembly is thus positioned in thermal contact with metal disk 11.

Figure 4:
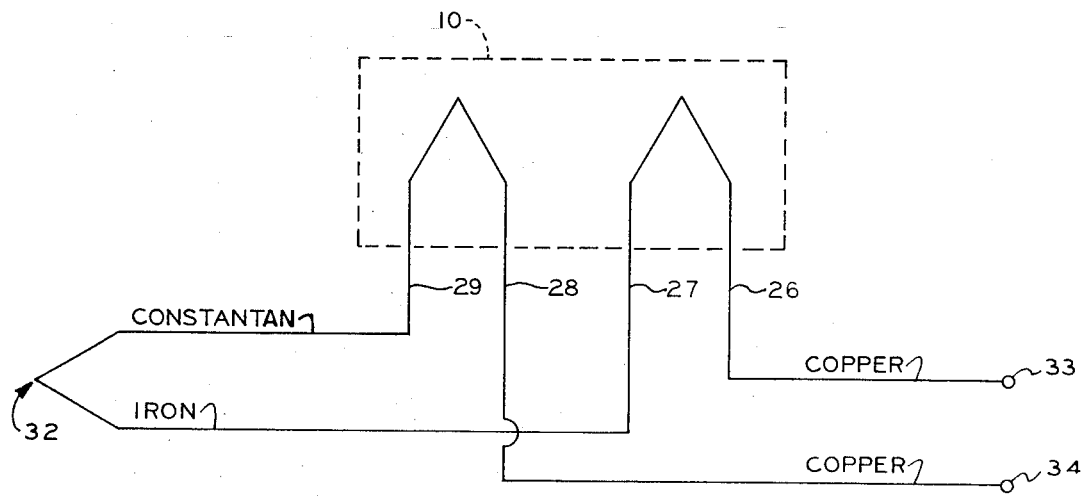
FIG. 4 is a schematic circuit drawing of one of the thermocouple assemblies.

One of the complete thermocouples is illustrated in FIG. 4. As previously mentioned, conductors 26, 27, 28 and 29 extend through cylinder 24 and are joined to form two reference thermocouple junctions. In the specific thermocouple illustrated in FIG. 4, conductors 26 and 28 are copper; conductor 27 if iron; and conductor 29 is constantan. Conductors 27 and 29 are joined at a remote location to provide a sensing thermocouple junction 32. This junction is located at a region of temperature to be measured. Conductors 26 and 28 are connected to respective terminals 33 and 34 which constitute the output terminals of the thermocouple. These terminals can be connected to a meter or to the input of a control circuit. The illustrated configuration permits the use of conventional copper wires to connect the reference thermocouple junctions to the measuring and/or control circuit. However, materials other than iron and constantan can be employed to form the thermocouples, as is well known in the art. The accomodates configuration accommodates eight thermocouple junctions. However, more can be provided if desired.

As previously mentioned, disk 11 is maintained at a constant temperature. This is accomplished by means of the four heating elements 20a, 20b, 20c and 20 d. The current flow through these elements is controlled by the circuit illustrated in FIG. 5. Temperature sensitive resistance elements 18 and 22 are connected in series relationship with a resistor 36 between potential terminals 37 and 38. A variable resistor 39 and a resistor 40 are also connected in series relationship between terminals 37 and 38. The junction between resistors 39 and 40 is connected to the first input of a differential amplifier 41, and the junction between elements 22 and 36 is connected to the second input of this amplifier. Amplifier 41 is provided with a feedback resistor 42. The output of amplifier 41 is connected by a resistor 43 to the base of a transistor 44. A resistor 45 is connected between the collector of transistor 44 and a terminal 46 which is maintained at a positive potential. The emitter of transistor 44 is connected to first terminals of heating elements 20a and 20b. Heating elements 20d and 20c are connected between respective elements 20a and 20b and a terminal 47 which is maintained at a negative potential. The second terminals of elements 20a and 20b are also connected directly to one another.

Figure 5:
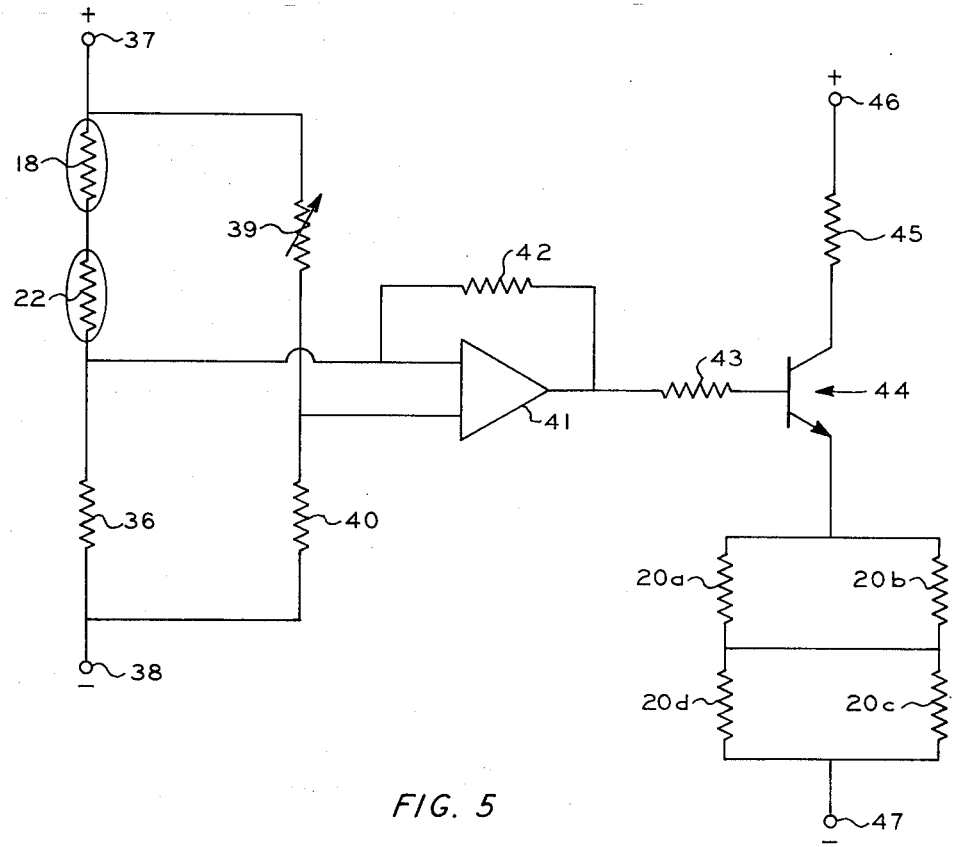
FIG. 5 is a schematic circuit drawing of the temperature control circuit.

The circuit of FIG. 5 provides a bridge network wherein temperature sensitive resistance elements 18 and 22 constitute one arm of the bridge. Any change in temperature of disk 11 is sensed by element 18, which thereby provides an output signal through amplifier 41 and transistor 44 to control the current flow through the heating elements. In this manner, sufficient heat is supplied to maintain the temperature of the disk and the thermocouple junctions mounted therein constant. Temperature sensitive resistance element 22 detects any change in ambient temperature surrounding housing 10 and provides a compensating signal in the circuit of FIG. 5. The net effect of element 22 is to adjust the set point of the controller for changes in ambient temperature. This serves to maintain more accurate temperature control than would be obtained from a single sensing element positioned within the housing.

The apparatus illustrated in FIGS. 1 to 3 is constructed so that the temperatures of the thermocouple leads remain substantially constant because the leads are passed through disk 11 prior to being inserted into the opening in the disk. This also contributes to more accurate temperature control. It is desirable that temperature sensing element 22 be positioned in close proximity to the region at which all of the electrical leads enter housing 10 of FIG. 1

In one specific embodiment of this invention, disk 11 was an aluminum cylinder 1¼ inch in diameter and ⅝ inch high. Holes 14 were approximately 3/16 inch in diameter and approximately 3/16 inch deep. Each of the four heating elements had a resistance of 120 ohms, with a rating of 1.5 watts. The potential difference between terminals 46 and 47 was 30 volts. Elements 18 and 22 were thermistors.

While this invention has been described in conjunction with a presently preferred embodiment, it obviously is not limited thereto.

What is claimed is:

1. In a temperature measuring system which includes a thermocouple having at least one temperature sensing junction and at least one reference temperature junction; apparatus for maintaining the reference junction at a constant temperature comprising:
    a housing enclosing said reference junction;
    a heating element disposed in said housing in thermal contact with said reference junction;
    a first thermistor disposed in said housing in thermal contact with said reference junction;
    a second thermistor positioned externally of said housing and in close proximity thereto;
    a bridge network having a source of potential connected thereacross, said first and second thermistors being connected in series relationship in one arm of said bridge network:
    means responsive to any electrical unbalance of said bridge network to establish a control signal which is representative of the combined temperatures sensed by said thermistors; and
    means responsive to said control signal to regulate said heating element.

2. The apparatus of claim 1 wherein said reference junction comprises two thermocouple junctions, and further comprising circuit means connecting the temperature sensing junction of said thermocouple in series relationship between said two reference junctions.

3. In a temperature measuring system which includes a thermocouple having at least one temperature sensing junction and at least one reference temperature junction; apparatus for maintaining the reference junction at a constant temperature comprising:
    a metal block surrounded by a mass of heat insulating material, said block having a plurality of openings therein, said reference junction being disposed in a first one of said openings in thermal contact with said block;
    a heating element disposed in a second one of said openings in thermal contact with said block;
    a first temperature sensing element disposed in a third one of said openings in thermal contact with said block;
    a second temperature sensing g element externally of said heat insulating material and in close proximity thereto;
    means responsive to said first and second temperature sensing elements to establish a control signal which is representative of the combined temperatures sensed by said elements; and
    means responsive to said control signal to regulate said heating element.

4. The apparatus of claim 7 wherein said block has additional openings through which electrical leads extending to said reference junction pass prior to being connected to said reference junction.

* * * * *

UNITED STATES PATENT OFFICE

CERTIFICATE OF CORRECTION

Patent No. 3,690,177      Dale A. Fluegel      Dated: Sept. 12, 1972

It is certified that error appears in the above-identified patent and that said Letters Patent are hereby corrected as shown below:

Cover page, first column, following paragraph No. [72], add:

-- [73] Assignee: Phillips Petroleum Company, Bartlesville, Okla. --

Column 4, line 32, delete "sensing g" and insert therefor -- sensing --.

Signed and sealed this 17th day of April 1973.

(SEAL)
Attest:

EDWARD M. FLETCHER, JR.
Attesting Officer

ROBERT GOTTSCHALK
Commissioner of Patents